Feb. 16, 1965    G. K. NEWELL    3,169,407
MOTION CONVERTING DEVICE
Filed Feb. 28, 1962    4 Sheets-Sheet 1

INVENTOR.
George K. Newell
BY
A. A. Steinmiller
Attorney

INVENTOR.
George K. Newell
BY
A. A. Steinmiller
Attorney

INVENTOR.
George K. Newell

Feb. 16, 1965 G. K. NEWELL 3,169,407
MOTION CONVERTING DEVICE
Filed Feb. 28, 1962 4 Sheets-Sheet 4

INVENTOR.
George K. Newell
BY
Attorney

United States Patent Office 3,169,407
Patented Feb. 16, 1965

3,169,407
MOTION CONVERTING DEVICE
George K. Newell, Level Green, Penn Township, Westmoreland County, Pa., assignor to Westinghouse Air Brake Company, Wilmerding, Pa., a corporation of Pennsylvania
Filed Feb. 28, 1962, Ser. No. 176,362
9 Claims. (Cl. 74—424.8)

This invention relates to a motion converting device and more particularly to an improved motion converting device, of the screw and traveling nut type, characterized by anti-friction means between the traveling nut and screw.

Certain motion converting devices presently on the market include a threaded shaft and a traveling nut between which are a plurality of anti-friction bearing elements, such as balls, that are disposed in contact with corresponding threads or helical ball races formed respectively in the shaft and the traveling nut. In some of these motion converting devices the traveling nut is provided or fitted with one or more tubular ball guide members which interrupt the path of the balls, deflect them from the helical race, lead them diagonally across the outside of the traveling nut, and direct them back again into the ball raceway. This design forms a closed circuit through which the rolling balls, as the medium of engagement between the threaded shaft or screw and the corresponding traveling nut, recirculate continually as the threaded shaft or screw and the corresponding traveling nut are rotated relative to each other. Consequently, the rotary motion is thus changed or converted to linear motion, or vice versa, with low friction loss.

Motion converting devices of the type mentioned above are all quite complicated and consequently the cost of manufacturing them is relatively high.

Accordingly, it is the general purpose of this invention to provide a simple, lightweight, efficient, and relatively low cost motion converting device of the screw and traveling nut type capable of changing rotary motion to linear motion, or vice versa, with low friction loss and without using a tubular guide member to circulate the balls across the outside of the traveling nut.

According to the present invention, a preferred embodiment of a motion converting device comprises a hollow traveling nut and a shaft extending therethrough, the shaft having on its periphery a single or a multiple helical specially shaped thread which may be polygonal (or arcuate) in cross section and of a depth slightly less than that of the radius of a plurality of large bearing balls that are disposed therein for rolling contact therewith. The projecting halves of the bearing balls extend into corresponding cavities formed in the traveling nut. Each cavity in the traveling nut is provided with a plurality of smaller balls that constitute a ball bearing each of which smaller balls has rolling contact with the surface of the larger bearing ball and an annular tapered race formed on the interior of a dished cylindrical race member. An annular retainer member having a plurality of spaced-apart fingers is arranged between the balls of the ball bearing and the annular tapered race. The fingers extend inwardly from the periphery of the annular retainer member with each finger disposed between two adjacent balls of the ball bearing. Each cylindrical race member is retained in its respective cavity in the traveling nut by a wedge-shaped snap ring that is inserted in a groove formed in the wall of the corresponding cavity in the traveling nut. Each large bearing ball cooperates with the specially-shaped thread in the shaft and with the smaller balls of the corresponding ball bearing to provide for rolling action therebetween, as the shaft is moved linearly in either direction without rotation on its longitudinal axis, to effect rotation of the traveling nut if the traveling nut be restrained against longitudinal movement. Furthermore, if the traveling nut be restrained against rotation and a force applied thereto in a direction parallel to the longitudinal axis of the shaft, the shaft will be rotated with respect to the traveling nut as the traveling nut travels along the shaft in one direction or in an opposite direction corresponding to the direction of action of the applied force.

When the helical thread is polygonal in cross section, it provides for two spaced paths of simultaneous rolling contact between the ball and the shaft within the thread. The smaller balls of the ball bearing are so disposed with respect to the large bearing ball that the line of action of the thrust force between the traveling nut and the shaft passes through the center of one of the smaller balls, the center of the large bearing ball, and midway between the two paths of rolling contact between the ball and shaft. Also, the two adjacent sides upon which the corresponding large bearing ball rolls form a groove or cavity into which any foreign matter that may enter the thread may be pushed and thus prevented from hindering the rolling of the large bearing ball in the thread.

*Description—FIGS. 1 to 4*

Figure 1:
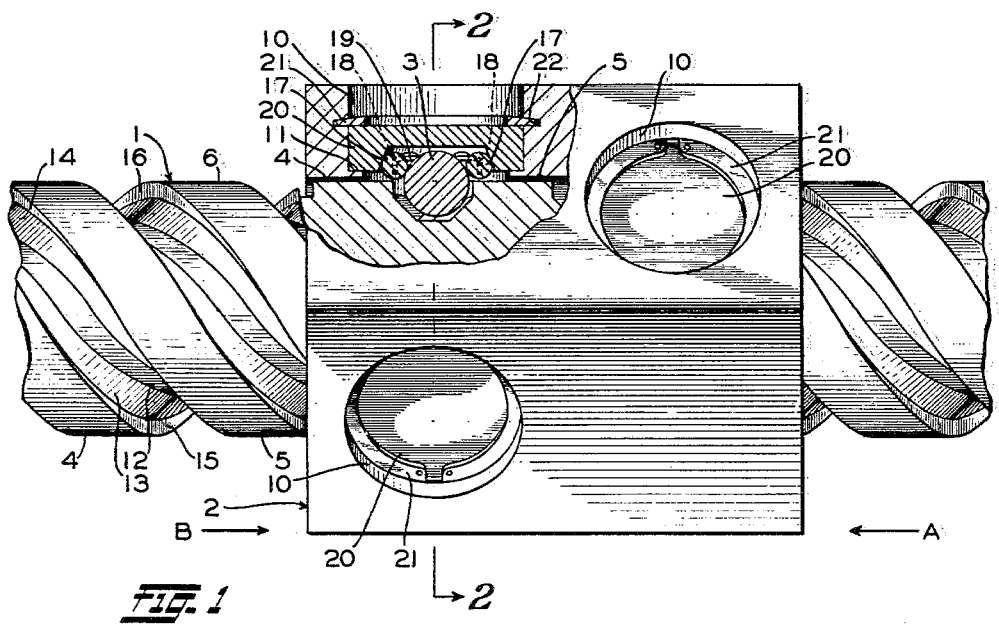
FIG. 1 is a plan view of a motion converting device comprising a screw and a traveling nut with a portion of the traveling nut broken away to show one of a plurality of bearing balls disposed between the screw and the nut.

Referring to FIG. 1 of the drawing, the motion converting device embodying the invention comprises a screw-threaded shaft 1, a hollow unthreaded traveling nut 2 through which the screw-threaded shaft 1 extends and a plurality of bearing balls 3 disposed between the screw-threaded shaft 1 and the hollow traveling nut 2.

While omitted from the drawings for simplicity and clarity, it will be understood that it is intended that the motion converting elements be suitably mounted in various ways by means well known, in order to utilize their functions either as a driving or a driven element. For example, the screw-threaded shaft 1 may be mounted for rotation on its longitudinal axis and restrained against longitudinal movement while the traveling nut 2 is restrained against rotation but adapted to move along the longitudinal axis of the shaft 1. With the motion converting elements so mounted, the threaded shaft 1 may be rotated by reversible power means, in which case the traveling nut 2 will travel correspondingly in one direction or the opposite direction depending on the direction of rotation of the shaft. If, on the other hand, a force is applied longitudinally to the traveling nut 2, then the threaded screw will be caused to rotate correspondingly in one direction or the opposite direction depending upon the direction of application of the force to the nut 2.

Also, it will be apparent that the screw-threaded shaft may be mounted so as to be shiftable along its longitudinal axis and restrained against rotation while the traveling nut 2 is restrained against longitudinal movement and free to rotate. In such case, if a force is applied to shift the shaft longitudinally, then the nut 2 will rotate correspondingly in one direction or the other without displacement longitudinally along the axis of the shaft, depending on the direction of application of force to the shaft. Also, if the nut is rotated, as by power means not shown, then the shaft will be caused to move along its longitudinal axis correspondingly in one direction or the opposite direction according to the direction of rotation of the nut 2.

More particularly, the shaft 1 includes triple right-hand threads 4, 5 and 6 which are separated one from the other by a helical thread groove machined in the outer periphery of the shaft 1. Obviously, there may be any desired number of threads on the shaft, which may be left or right handed as is best suited to a particular situation.

Figure 2:
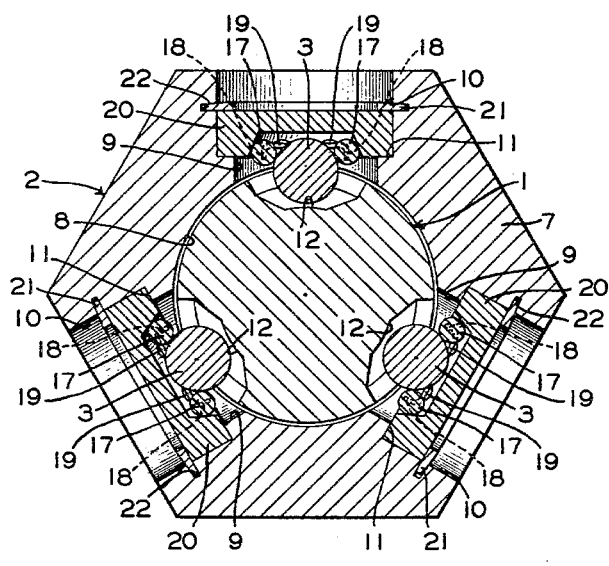
FIG. 2 is a vertical cross-sectional view of the screw and traveling nut shown in FIG. 1, taken along the line 2—2 of FIG. 1 and looking in the direction of the arrows, showing details of the specially-shaped helical polygonal thread formed in the periphery of the screw and the means for retaining a bearing ball between the screw and the nut.

As shown in FIG. 2, the hollow traveling nut 2 comprises a hexagonal-shaped body 7 having a longitudinal bore 8 extending therethrough, the diameter of the bore 8 being slightly greater than the outside diameter of the screw-threaded shaft 1. The alternate sides of the hexagonal-shaped body 7 are provided with cavities each of which comprises a bore 9 and a coaxial counterbore 10, the inner end of which forms a shoulder 11.

Figure 3:
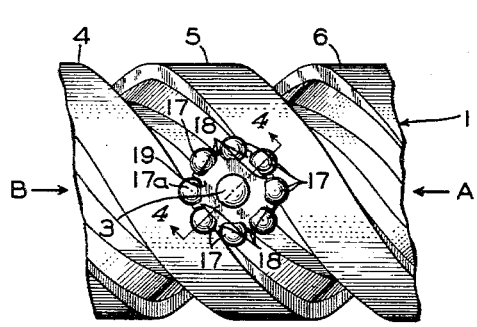
FIG. 3 is a plan view showing a large bearing ball and its corresponding ball bearing in an assembled position in the thread formed in the screw with the traveling nut omitted for sake of clarity.
Figure 4:
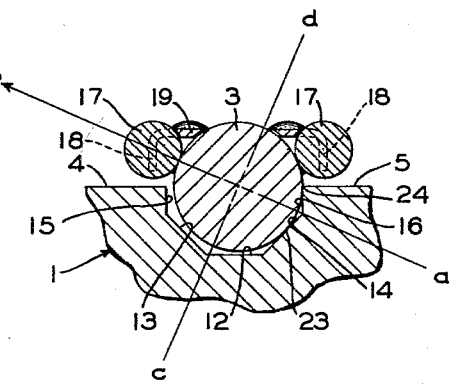
FIG. 4 is a vertical cross-sectional view, on an enlarged scale, taken along the line 4—4 of FIG. 3, showing the paths of contact between the large bearing ball and the screw, and the direction of the line of action of the thrust force transmitted from the screw to the large bearing ball.

As shown in FIG. 4, the crest of the right-hand threads 4 and 5 are separated by a helical screw-thread groove that is polygonal in cross section. As shown in FIG. 4, this helical thread groove has a root 12 from the opposite ends of which extend inclined surfaces 13 and 14 which intersect, respectively, vertical surfaces 15 and 16 so that the surfaces 12, 13, 14, 15 and 16 form a polygonal groove in which one of the bearing balls 3 is disposed as illustratively shown in FIG. 4. The polygonal groove cooperates with the bearing ball 3 disposed therein to form therebetween a cavity into which any foreign matter that may enter the thread groove may be pushed and thus prevented from hindering the rolling of the bearing ball. The bearing balls 3 are retained in their respective thread grooves by a ball bearing which comprises a plurality of small balls 17 which, as shown in FIGS. 3 and 4, are disposed about the respective larger bearing ball 3. Each small ball 17 is spaced from an adjacent small ball 17 by one of a plurality of fingers 18 that extend downward from and at a right angle to the periphery of an annular retaining member 19, as shown in FIG. 4.

As shown in FIGS. 1, 2, 3 and 4, the surface of the respective bearing balls 3 have rolling contact with the surface of the corresponding small balls 17, which small balls 17 are disposed in spaced-apart relation between the spherical surface of the respective bearing ball 3 and a dished ball race 20 (FIGS. 1 and 2), the inner end of which rests against a corresponding shoulder 11. Each of the dished ball races 20 is retained against the corresponding shoulder 11 by means of a tapered snap ring 21 that is inserted in a groove 22 machined in the wall of the corresponding counterbore 10.

*Operation*

In the absence of a force acting on the screw-threaded shaft 1 in a direction coinciding with its axis, the bearing balls 3 will move from the position in which the one bearing ball 3 is shown in FIG. 4 to a position in which the respective bearing balls 3 contact the root 12 of the respective thread groove in which the respective bearing balls 3 are disposed. As the respective bearing balls 3 move from the position shown in FIG. 4 to the position in which the bottom of the respective bearing balls 3 contacts the root 12 of the thread in which the respective bearing ball is disposed, each respective bearing ball moves out of contact with the corresponding inclined surface 14 and vertical surface 16 shown in FIG. 4.

Let it be supposed that the hollow traveling nut 2 is restrained against longitudinal movement along the axis of the screw-threaded shaft 1 but may rotate about this axis. Let it be further assumed that the screw-threaded shaft 1 is supported so that it may move in either direction along its longitudinal axis without rotation thereabout. If now a thrust force is applied to the screw-threaded shaft 1 in the direction of the arrow A shown in FIGS. 1 and 3, this thrust force acting on the screw-threaded shaft 1 will move the screw-threaded shaft 1 in the direction of the left hand along its longitudinal axis without rotation on its longitudinal axis and thereby cause the respective bearing balls 3 to roll up the inclined surface 14 (FIG. 4) and out of contact with the corresponding thread root 12 until each of the respective bearing balls 3 contacts the corresponding vertical surface 16 in which position one of the bearing balls 3 in shown in FIG. 4. In this position, each of the bearing balls 3 has point contact with the inclined surface 14 at a point 23 thereon and also point contact with the vertical surface 16 at a point 24 on this vertical surface.

From the above, it is apparent that two components of the thrust force applied to the screw-threaded shaft 1 in the direction of arrow A are transmitted to the bearing ball 3 at the points 23 and 24. From viewing FIGS. 3 and 4, it will be understood that these two force components are acting in a direction perpendicular to the cutting plane of line 4—4 in FIG. 3, and equidistant from a line $a-b$ shown in FIG. 4 as passing through the center of the bearing ball 3 and one of the small balls 17. Therefore, these two force components are effective to rotate the bearing ball 3 shown in FIG. 4 about a line $c-d$ which constitutes an "axis of spin" for the bearing ball 3 and which line $c-d$, as shown in FIG. 4, is at a right angle to the line $a-b$. As the bearing ball 3 rotates about its axis of spin, it rolls along two paths of contact in the corresponding thread groove in the screw-threaded shaft 1, the point 23 on the inclined surface 14 lying on one of these paths and the point 24 on the vertical surface 16 lying on the other of these paths.

From FIGS. 2, 3 and 4, it will be seen that the spherical surface of each of the bearing balls 3 has point contact with each of the small balls 17 of the corresponding ball bearing. Therefore, as each bearing ball 3 rotates on its "axis of spin" as it rolls along the two paths of contact in its corresponding thread groove, it effects rotation of the small balls 17 of the corresponding ball bearing so that these small balls 17 roll around a ball track formed by the inclined sides of the respective ball race 20. Since the respective ball races 20 are anchored to the hollow traveling nut 2 by the tapered snap rings 21, the bearing balls 3, as they roll along the two paths of contact in their respective thread grooves in the screw-threaded shaft 1 as it moves in the direction of arrow A, transmit a force through the balls 17 of the corresponding ball bearings and the corresponding dished ball races 20 to the hollow traveling nut 2 to cause it to rotate about the axis of the screw-threaded shaft 1 without longitudinal movement along this axis since, as has been assumed, the hollow traveling nut 2 is restrained against longitudinal movement along this axis.

From the above, it is apparent that the motion converting device shown in FIGS. 1 to 4, inclusive, is capable of converting longitudinal movement of the screw-threaded shaft 1 in the direction of arrow A into rotary motion of the hollow traveling nut 2 about the longitudinal axis of the screw-threaded shaft 1.

Let it now be supposed that it is desired to convert linear movement of the hollow traveling nut 2 along the longitudinal axis of the screw-threaded shaft 1 into rotary motion of the screw-threaded shaft 1 about its longitudinal axis. Accordingly, let it be supoposed that the hollow traveling nut 2 is restrained against rotation about the longitudinal axis of the screw-threaded shaft 1 but may have linear movement in either direction along this axis. If now a thrust force is applied to the hollow traveling nut 2 in the direction of the arrow B shown in FIGS. 1 and 3, the force thus applied to the hollow traveling nut 2 is transmitted through the dished ball races 20 disposed in the counterbores 10 in the hollow traveling nut 2 to each small ball 17a shown in FIG. 3 carried in each dished ball race. The force thus transmitted to each small ball 17a acts in the direction of a line that lies in a plane that passes through the center of the respective small ball 17a and the center of the corresponding bearing ball 3. It will be noted from FIG. 3 that this plane does not pass through the two points 23 and 24 (FIG. 4) of contact between the bearing ball 3 and the corresponding thread groove in the screw-threaded shaft 1. Consequently, the direction of action of the force transmitted to the bearing balls 3 from the hollow traveling nut 2 is effective to cause the screw-threaded shaft 1 to rotate on its own axis since, as has been assumed, the hollow traveling nut 2 is restrained against rotation. In other words, the force acting on each bearing ball 3 tends to roll it along the two paths of contact in the corresponding thread groove in the screw-threaded shaft 1 and thus around the screw-threaded shaft 1, but, since the hollow traveling nut 2 is restrained against rotation, the bearing balls 3 cannot thus roll around the screw-threaded shaft 1. Therefore, the bearing balls 3 effect rotation of the screw-threaded shaft 1 on its longitudinal axis and linear movement of the hollow traveling nut 2 along this axis in the direction of the arrow B.

If a thrust force is applied to the hollow traveling nut 2 in the direction of the arrow A shown in FIGS. 1 and 3, the screw-threaded shaft 1 will be rotated on its longitudinal axis in a direction opposite to the direction of rotation effected by the thrust force acting in the direction of the arrow B.

Figures 5, 6:
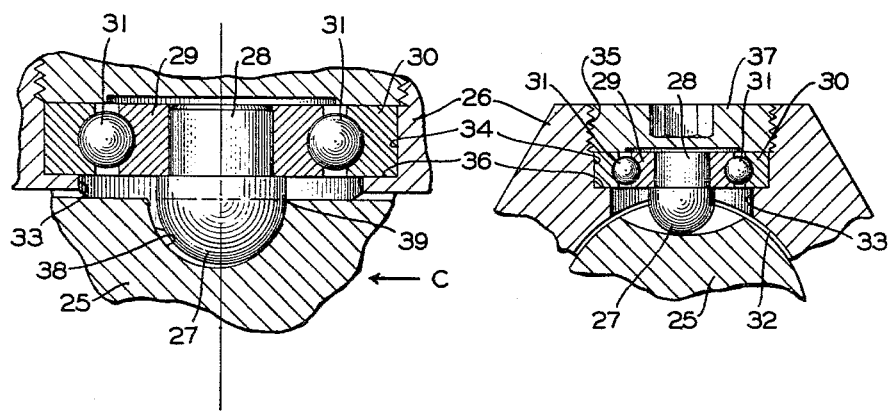
FIG. 5 is a partial vertical cross-sectional view, on an enlarged scale, showing a second embodiment of a motion converting device similar to that of FIG. 4 but in which the helical thread in the shaft is arcuate in cross section.
FIG. 6 is a partial vertical cross-sectional view showing certain details of the screw and traveling nut of the second embodiment of the invention.

*Description—FIGS. 5 and 6*

FIGS. 5 and 6 of the drawings show a motion converting device that constitutes a second embodiment of the invention. This motion converting device comprises a screw-threaded shaft 25, a hollow traveling nut 26 through which the screw-threaded shaft 25 extends, and a plurality of spherical-ended plugs 27 each having a shank 28 that is press-fitted into an inner race 29 of a conventional ball bearing carried by the hollow traveling nut 26. Each of these ball bearings comprises, in addition to the inner race 29, an outer race 30 and a plurality of balls 31 disposed between the races.

As shown in FIG. 6, the hollow traveling nut 26 comprises a hexagonal-shaped body having a bore 32 extending therethrough, the diameter of the bore 32 being slightly greater than the outside diameter of the screw-threaded shaft 25. The alternate sides of the hollow hexagonal-shaped traveling nut 26 are provided with cavities each of which comprises a bore 33, a counterbore 34, and a coaxial threaded counterbore 35. The inner end of the counterbore 34 forms a shoulder 36 against which rests the lower side of the outer race 30 of the ball bearing. A threaded plug 37 is screw-threaded into the threaded counterbore 35 to retain the ball bearing races 29 and 30 and the balls 31 in an assembled position.

The screw-threaded shaft 25 is of the multiple-threaded type which, for example, may include triple right-hand helical threads machined in the outer periphery thereof. As shown in FIG. 5, which corresponds to FIG. 4 of the first embodiment of the invention, these triple right-hand helical threads are separated by a thread groove 38 that is arcuate or semi-circular in cross section, the radius of which semicircle is slightly greater than the radius of the spherical-ended plug 27 to provide a cavity into which any foreign matter that may enter the thread groove may be pushed and thus prevented from hindering the rotation of the spherical-ended plug 27 and the inner ball bearing race 29.

It is evident from FIG. 5 that when a longitudinal thrust force is applied to the screw-threaded shaft 25 in the direction of the arrow C, the spherical-ended plug 27 has point contact with the screw-threaded shaft 25 at a point 39 located at the upper right-hand end of the threaded groove 38 and the spherical-ended plug 27 rolls along a single path passing through the point 39 rather than along two paths as do the bearing balls 3 shown in FIGS. 1 to 4, inclusive. In all other respects, the operation of the second embodiment of the invention shown in FIGS. 5 and 6 is substantially the same as that of the first embodiment shown in FIGS. 1 to 4, inclusive, and need not be described in detail.

Figure 7:
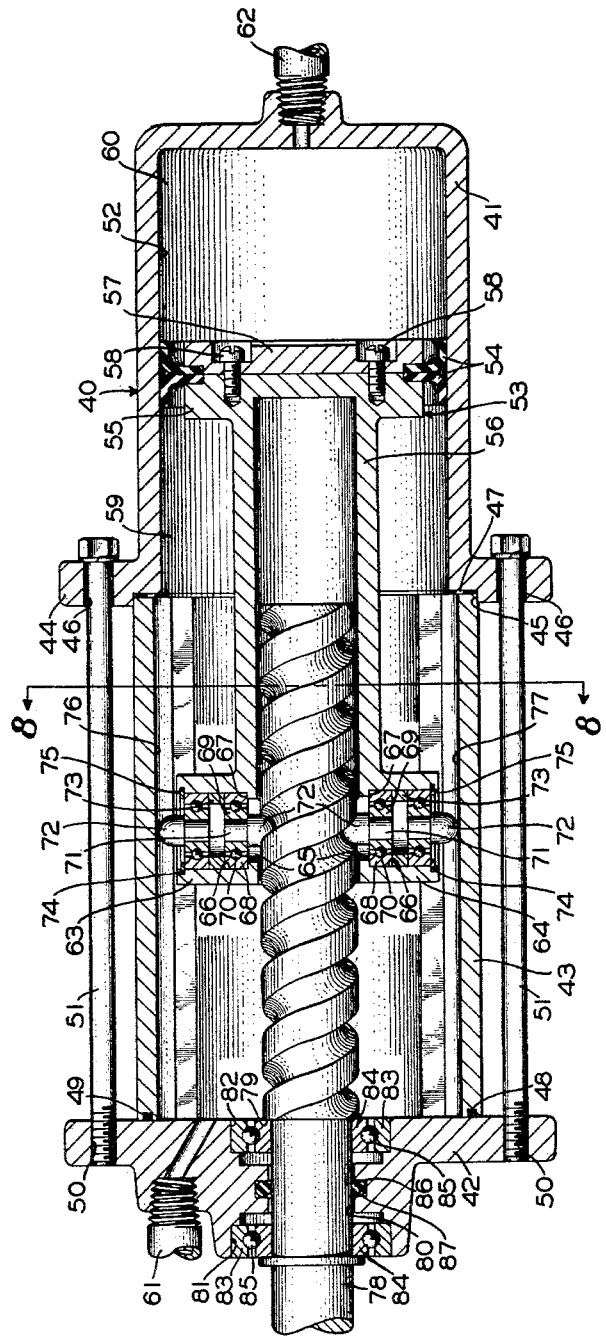
FIG. 7 is a vertical cross-sectional view of a fluid motor in which the second embodiment of the invention is used to convert linear motion of a piston to rotary motion of a shaft.
Figure 8:
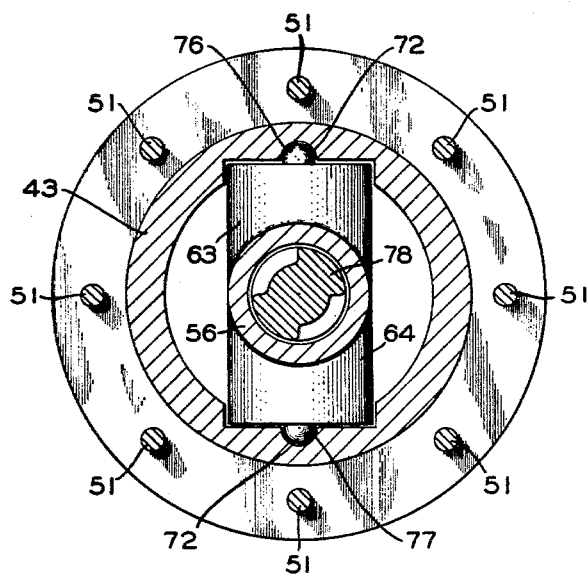
FIG. 8 is a vertical cross-sectional view, taken along the line 8—8 in FIG. 7 and looking in the direction of the arrows showing certain details not apparent in FIG. 7.

*Description—FIGS. 7 and 8*

FIGS. 7 and 8 of the drawings show a motion translating device in the form of a fluid motor 40 embodying the structure shown in FIGS. 5 and 6. The fluid motor 40 may be adapted for a variety of uses, as for example, to effect the rocking of the brake lever in a unit brake assembly of the type described and claimed in the co-pending application of George K. Newell, Serial No. 167,690, filed in the United States Patent Office on January 22, 1962, now Patent No. 3,131,788, and assigned to the assignee of the present application.

The fluid motor 40 comprises a cup-shaped cylinder body 41 and a pressure head 42 between which is coaxially disposed a sleeve member 43. The open end of the cup-shaped cylinder body 41 is provided with an outwardly extending annular flange 44 that has a shallow coaxial counterbore 45 and a plurality of arcuately spaced bores 46. One end of the sleeve member 43 is disposed in the counterbore 45 with an annular gasket 47 interposed between the one end of the sleeve member 43 and the end of the counterbore 45. The opposite end of the sleeve member 43 is provided with an annular groove 48 in which is carried an O-ring seal 49. The pressure head 42 is provided with a plurality of screw-threaded bores 50 having the same arcuate spacing as the bores 46 in the annular flange 44. The sleeve member 43 is rigidly clamped between the annular flange 44 and the pressure head 42 by a plurality of bolts 51 extending through the respective bores 46 in the annular flange 44 and having screw-threaded engagement with corresponding screw-threaded bores 50 in the pressure head 42.

The cup-shaped cylinder body 41 is provided with a bottom bore 52 in which is slidably mounted a power piston 53 comprising two oppositely arranged packing cups 54 that are clamped between a flange 55 formed on one end of a hollow piston rod 56 and a follower member 57 by a plurality of cap screws 58, two of which are shown in FIG. 7. The power piston 53 cooperates with the cup-shaped cylinder body 41, the sleeve member 43 and the pressure head 42 to form on opposite sides of the power piston 53 a pair of fluid pressure chambers 59 and 60 to which fluid under pressure can be supplied respectively through a conduit 61 secured to the pressure head 42 and a conduit 62 secured to the closed end of the cup-shaped cylinder body 41.

In order to prevent rotation of the power piston 53 within the bottom bore 52, the left-hand end of the hollow piston rod 56, as viewed in FIG. 7, is provided with two diametrically opposite bosses 63 and 64 each arranged at a right angle to the longitudinal axis of the hollow piston rod 56.

As shown in FIG. 7, each of the bosses 63 and 64 has a bore 65 extending therethrough and opening into the interior of the hollow piston rod 56. Coaxial with each of the bores 65 is a counterbore 66 the inner end of which forms a shoulder 67. Resting against each of the shoulders 67 is an outer race 68 of a first ball bearing that also comprises an inner race 69 and a plurality of balls 70 interposed between the inner and outer races.

Press-fitted into each of the inner races 69 is a shank 71 of a spherical-ended plug 72. Each of the first ball bearings is separated from an identical second ball bearing by an annular spacer member 73 also disposed in the respective counterbore 66. The respective two ball bearings and corresponding annular spacer member 73 are retained in the respective counterbore 66 by a snap ring 74 that is inserted in a groove 75 formed in the wall of the respective counterbore 66.

The spherical-ended plug 72 carried by the inner race of each of the second ball bearings is disposed in one of two diametrically opposite semicircular longitudinally extending grooves 76 and 77 formed in the interior wall of the sleeve member 43. It is clearly apparent from FIGS. 7 and 8 that these two diametrically oppositely arranged spherical-ended plugs 72 and their corresponding grooves 76 and 77 will positively prevent rotation of the power piston 53 and the hollow piston rod 56 with respect to the cup-shaped cylindrical body 41 and the sleeve member 43 as the power piston 53 is moved in one direction or in an opposite direction in response to the supply of fluid under pressure to one of the chambers 59 or 60 and the venting of fluid under pressure from the other chamber.

Extending into the open end of the hollow piston rod 56 is one end of a shaft 78 having a double helical right-hand thread, arcuate in cross section, machined in the outer periphery thereof for a portion of its length extending in the direction of the left hand, as viewed in FIG. 7, from said one end to the right-hand side of the pressure head 42. The remaining portion of the shaft 78 is unthreaded and of reduced diameter thereby forming a shoulder 79 at the left-hand end of the threaded portion of the shaft.

The spherical-ended plug 72 carried by the inner race 69 of each of the above-mentioned first ball bearings is disposed in one of the two helical right-hand thread grooves machined in the shaft 78, as is shown in FIG. 7 of the drawings, to provide a driving connection between the power piston 53 and the shaft 78 whereby the rotation of the shaft 78 can be effected in response to linear movement of the power piston 53 within the bottom bore 52 in the cup-shaped cylinder body 41.

The unthreaded portion of the shaft 78 on the left-hand side of the shoulder 79 extends through a bore 80 in the pressure head 42 and is rotatably mounted in a pair of identical spaced-apart ball bearings carried respectively in coaxial counterbores 81 and 82 extending inward from the opposite faces of the pressure head. Each of these ball bearings comprises an outer race 83 press-fitted into one of the counterbores 81 and 82, an inner race 84 press-fitted onto the reduced portion of the shaft 78, and a plurality of balls 85 interposed between the respective inner and outer races so as to have rolling contact therewith as the shaft 78 is rotated about its longitudinal axes.

Leakage from the chamber 59 along the shaft 78, which extends through the bore 80 in the pressure head 42 to the exterior of the fluid motor 40, is prevented by a resilient gasket ring 86 disposed in surrounding relation to the periphery of the unthreaded portion of the shaft 78 and in a groove 87 formed in the pressure head 42 in coaxial relation to the bore 80.

Operation

Let it be assumed that fluid under pressure is completely vented from the chambers 59 and 60. Further, assume that the power piston 53, the hollow piston rod 56 and the shaft 78 occupy the position in which they are shown in FIG. 7 of the drawings. Let it now be assumed that fluid under pressure is supplied to the chamber 59 through the conduit 61 while the chamber 60 remains open to atmosphere through the conduit 62. Fluid under pressure thus supplied to the chamber 59 acts on the left-hand face of the power piston 53 to move it in the direction of the right hand until the follower member 57 abuts the right hand or closed end of the cup-shaped cylinder body 41.

It is evident from FIG. 7 of the drawings that the fluid under pressure acting on the left-hand face of the power piston 53 is effective, through the hollow piston rod 56, the bosses 63 and 64 on the left-hand end of the hollow piston rod 56, the outer races 68, balls 70, inner races 69, shanks 71 and the sperical-ended plugs 72 of each of the above-mentioned first ball bearings, to exert a thrust force in the direction of the right hand on the screw-threaded portion of the shaft 78 which is effective, as explained in connection with the structure shown in FIGS. 5 and 6 of the drawings, to cause rotation of the shaft 78 in one direction about its longitudinal axis as the power piston 53 moves in the direction of the right hand.

Let it now be supposed that fluid under pressure is vented from the chamber 59 through the conduit 61 to atmosphere while fluid under pressure is simultaneously supplied to the chamber 60 through the conduit 62. Fluid under pressure thus supplied to the chamber 60 acts on the right-hand face of the power piston 53 to move it in the direction of the left hand until the bosses 63 and 64 carried on the left-hand end of the hollow piston rod 56 abut the right-hand face of the pressure head 42.

It is likewise evident from FIG. 7 that the fluid under pressure acting on the right-hand face of the power piston 53 is effective, through the hollow piston rod 56, the bosses 63 and 64 on the left-hand end of the hollow piston rod 56, the outer races 68, balls 70, inner races 69, shanks 71, and the spherical-ended plugs 72 of each of the above-mentioned first ball bearings, to exert a thrust force in the direction of the left hand on the screw-threaded portion of the shaft 78 which is effective to cause rotation of the shaft 78 about its longitudinal axis in a direction opposite the above-mentioned one direction as the power piston 53 moves in the direction of the left hand.

From the above, it is apparent that the supply of fluid under pressure to the one or the other face of the power piston 53 is effective to move the power piston 53 in a corresponding direction to cause the shaft 78 to rotate in one direction or in an opposite direction about its longitudinal axis.

As hereinbefore stated, FIGS. 7 and 8 of the drawings show a motion translating device in the form of a fluid motor 40 embodying the structure shown in FIGS. 5 and 6. It should be understood, however, that the structure disclosed in FIGS. 1 to 4, inclusive, of the drawings can be used in the fluid motor 40 in lieu of the structure shown in FIGS. 5 and 6 if desired.

Having now described the invention, what I claim as new and desire to secure by Letters Patent is:

1. A motion converting mechanism comprising:
   (a) a hollow unthreaded nut having a radial aperture therein,
   (b) a bearing member comprising a plurality of balls, the centers of said balls lying in a circle, said bearing member being removably carried in said radial aperture,
   (c) a shaft disposed within said hollow unthreaded nut and having thereon a helical groove, the cross section of which has at least two intersecting sides forming an angle, the bisector of which passes through a point on the circumference of the circle passing through the centers of the balls of said bearing member, and (d) a sphere rotatably mounted in said bearing member and having a portion thereof disposed in said helical groove on said shaft for rolling contact with two paths of point contact, each of which paths is on a separate one of two adjacent sides whereby, with said hollow unthreaded nut restrained against rotation and said shaft restrained against movement along its longitudinal axis, upon the exertion of a longitudinal thrust force to said hollow unthreaded nut in either direction, said sphere effects rotation of said shaft about its longitudinal axis, and upon rotation of said shaft in either direction about its longitudinal axis, said sphere transmits a force to said hollow unthreaded nut to cause said nut to travel correspondingly and longitudinally along said shaft.

2. A motion converting mechanism, as claimed in claim 1, further characterized in that with said hollow unthreaded nut restrained against movement along the longitudinal axis of said shaft and said shaft restrained against rotation in either direction about its longitudinal aixs, the exertion of a longitudinal thrust force on said shaft in either direction causes movement of said shaft along its longitudinal axis to transmit, via said sphere, a force to said hollow unthreaded nut to effect rotation thereof about the longitudinal axis of said shaft, and rotation of said hollow unthreaded nut about the longitudinal axis of said shaft in either direction will transmit, via said sphere, a force to said shaft to cause longitudinal movement of said shaft, without rotation, in a corresponding direction along its axis.

3. A motion converting mechanism, as claimed in claim 1, further characterizing in that the portion of said sphere that is disposed in said helical groove on said shaft for rolling contact with two paths of point contact each of which paths is on a separate one of two adjacent sides of said helical groove, rolls along said paths on said two adjacent sides with substantial clearance therebetween and the remaining sides of said helical groove.

4. A motion converting mechanism, as claimed in claim 1, further characterized in that the diameter of said sphere is greater than the diameter of said balls of said bearing member.

5. A motion converting mechanism, as claimed in claim 1, further characterized in that the bisector of the angle formed by two of said intersecting sides of said helical groove passes through the center of said sphere.

6. A motion converting mechanism, as claimed in claim 1, further characterized in that said sphere has rolling contact with the surface of the balls of said bearing member.

7. A motion converting mechanism comprising:
(a) a hollow unthreaded nut having a plurality of spaced-apart radial apertures therein,
(b) a plurality of bearing members each comprising a plurality of balls, the centers of said balls lying in a circle, and each bearing member being removably carried in a corresponding one of said apertures,
(c) a shaft disposed within said hollow unthreaded nut and having thereon a plurality of uniformly spaced helical grooves of the same pitch, the cross section of each groove having a plurality of sides, two of which adjacent sides intersect to form an angle, the bisector of which passes through a point on the circumference of the circle passing through the centers of the balls of a corresponding bearing member, and
(d) a plurality of spheres, each rotatably mounted in a corresponding bearing member and having a portion thereof disposed in a corresponding one of said plurality of helical grooves for rolling contact with two paths of point contact, each of which paths is on a separate one of two adjacent sides of the corresponding one of said plurality of helical grooves whereby, with said hollow unthreaded nut restrained against rotation and said shaft restrained against movement along its longitudinal axis, upon the exertion of a longitudinal thrust force to said hollow unthreaded nut in either direction, said spheres effect rotation of said shaft about its longitudinal axis, and upon rotation of said shaft in either direction about its longitudinal axis, said spheres transmit a force to said hollow unthreaded nut to cause said nut to travel longitudinally along said shaft.

8. A motion converting mechanism comprising:
(a) a cup-shaped cylinder including a pressure head sealingly secured thereto in coaxial alinement therewith, said cup-shaped cylinder having at least one longitudinally extending groove therein,
(b) a shaft coaxial with said cylinder and mounted in the pressure head of said cylinder for rotation around its longitudinal axis while restrained against linear movement therealong, said shaft having thereon at least one helical groove,
(c) a hollow unthreaded traveling nut comprising a sleeve into which said shaft extends, said sleeve having integral therewith at one end at least one hollow boss and at the opposite end a power piston secured thereto for slidable movement in said cup-shaped cylinder in response to differential fluid pressure acting thereon,
(d) means carried in said hollow bosses, and cooperating with the longitudinal extending grooves in said cup-shaped cylinder for restraining the power piston of said hollow unthreaded traveling nut against rotation within said cup-shaped cylinder while said piston moves linearly in one direction or in an opposite direction, and
(e) a rotatable member carried in each of said hollow bosses and each including a spherical portion which extends into one of the helical grooves in said shaft to effect rotation of said shaft about its longitudinal axis without linear movement thereof along said longitudinal axis.

9. A motion converting mechanism comprising:
(a) a cylinder including a cup-shaped member, a sleeve and a pressure head sealingly secured together in coaxial alinement, said sleeve having two internal diametrically disposed longitudinally extending grooves therein,
(b) a shaft coaxial with said cylinder and mounted in the pressure head of said cylinder for rotation around its longitudinal axis while restrained against linear movement therealong, said shaft having thereon two parallel, spaced-apart helical grooves,
(c) a hollow unthreaded traveling nut comprising a sleeve into which said shaft extends, said sleeve having integral therewith at one end two diametrically opposite hollow bosses and at the opposite end a power piston secured thereto for slidable movement in the cup-shaped member of said cylinder in response to the supply of fluid under pressure to one side thereof while the opposite side is open to atmosphere,
(d) a pair of identical, spaced-apart bearing members disposed in each of the hollow bosses at one end of said sleeve, each bearing member having an outer race which is fixed in the respective hollow boss and an inner race rotatably mounted with respect to said outer race, and
(e) a pair of oppositely extending spherical-ended plugs for each one of said pair of spaced-apart bearings, each of said plugs having a shank press-fitted into a respective one of the inner races of the respective pair of spaced-apart bearing members for rotation therewith, whereby the external ones of said spherical-ended plugs are disposed respectively in the two internal diametrically opposite longitudinal grooves in the sleeve of said cylinder and the internal ones of said spherical-ended plugs are disposed respectively in the two parallel, spaced-apart helical grooves on said shaft for rolling contact therewith in response to the supply of fluid under pressure to one or to the other side of the power piston to cause said spherical-ended plugs to effect rotation of said shaft about its longitudinal axis in one direction or in an opposite direction as the internal ones of said spherical-ended plugs roll along the two parallel, spaced-apart helical grooves on said shaft.

References Cited in the file of this patent

UNITED STATES PATENTS

| | | |
|---|---|---|
| 2,045,811 | Twyman | June 30, 1936 |
| 2,847,869 | Hogan et al. | Aug. 19, 1958 |
| 3,062,070 | Beatty et al. | Nov. 6, 1962 |

FOREIGN PATENTS

| | | |
|---|---|---|
| 500,281 | Italy | Nov. 17, 1954 |
| 1,148,679 | France | June 24, 1957 |